United States Patent Office 3,059,453
Patented Oct. 23, 1962

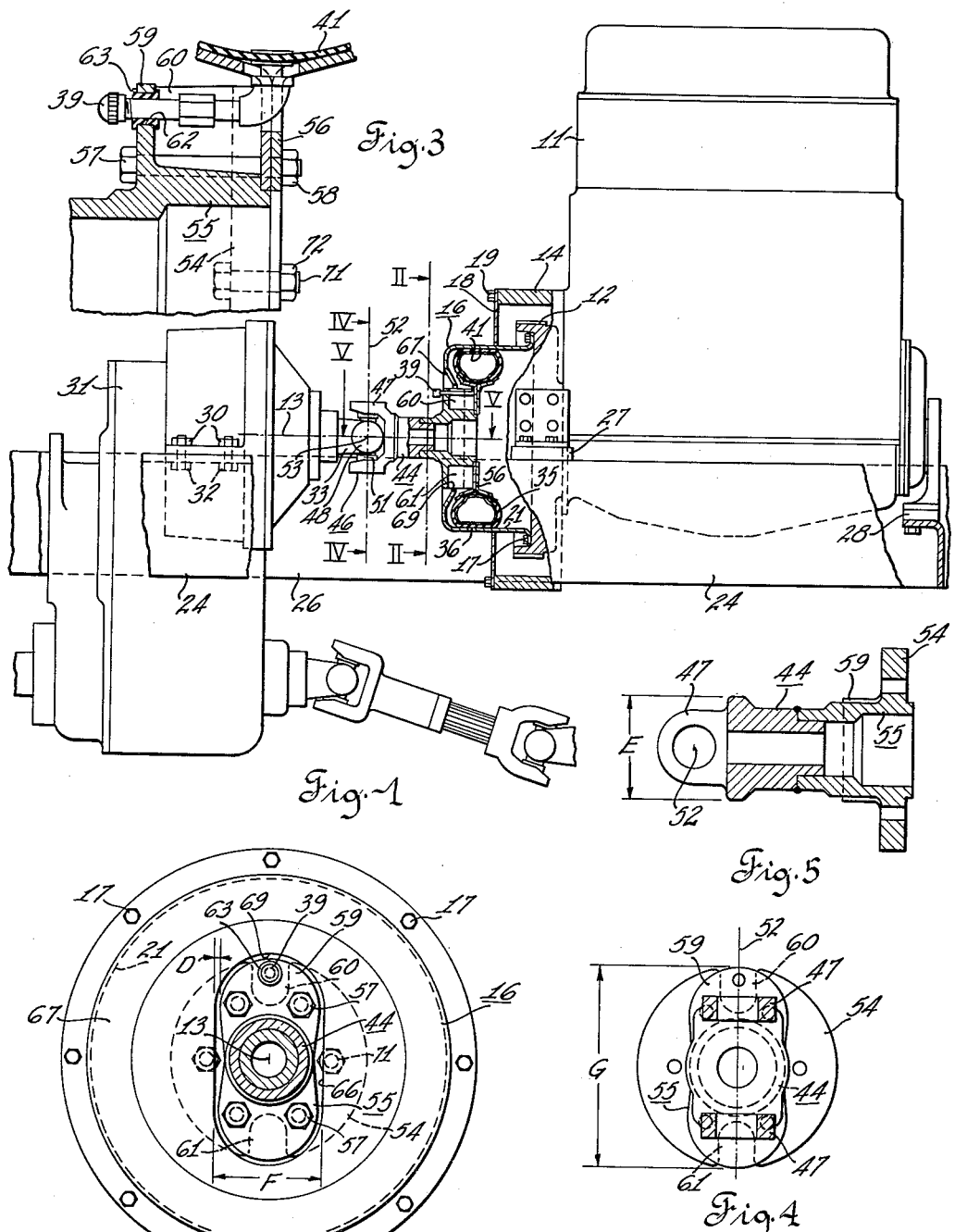

3,059,453
VIBRATION DAMPENING COUPLING
James B. Codlin, Lake Bluff, Ill., assignor to Allis-Chalmers Manufacturing Company, Milwaukee, Wis.
Filed Dec. 14, 1960, Ser. No. 75,738
5 Claims. (Cl. 64—11)

This invention relates to a flexible coupling for transmitting power from a rotary output member of a power source to a rotary driven member. More particularly this invention is concerned with providing a flexible power transmitting coupling for connecting an engine in driving relation to a change speed transmission.

Heretofore, it has been suggested that rubber tires be used to transmit power from an engine to a final drive train. In these prior art constructions the tire is inflated to engage the interior cylindrical surface of a rotating member attached to the input or output shafts. A number of these prior art couplings were employed as clutches wherein upon deflation of the tire the driving connection is interrupted and upon inflation of the tire the driving connection is reestablished. The present invention is concerned with a flexible coupling rather than a clutch type connection, and the tire employed is deflated during initial installation and also upon replacement or repair of the tire, but otherwise it is intended that the tire will remain inflated and in frictional power transmitting engagement with a cooperating member rotating in unison therewith. In this type of coupling it has been found desirable from the standpoint of safety and convenience to provide means for positively driving a vehicle so equipped in case the tire is deflated accidentally.

In conventional vehicle construction wherein the transmission is rigidly secured to the main frame of the vehicle and the engine is mounted on the main frame through flexible mounting pads, it has been a common practice to provide a double universal joint, that is a pair of universal joints between the engine and the transmission. When a power shift type transmission is employed in an engine powered vehicle, the usual engine clutch may be eliminated, and this makes it possible for a tire type coupling to be used in place of the usual engine clutch. Further, use of a tire coupling eliminates the requirement for at least one of the universal joints and this effects a cost saving of a universal joint.

It is an object of this invention to provide a flexible coupling which will take care of the hereinbefore mentioned requirements in a satisfactory manner.

It is a further object of this invention to provide a flexible coupling employing a tire coaxial with an engine drive shaft and a positive driving connection to provide power transmission in case of tire failure in the coupling.

It is a further object of this invention to provide a tire coupling which is simple to service, easy to install, and inexpensive.

These and other objects of the invention will become apparent when the following description is read in conjunction with the drawings in which:

FIG. 1 shows an engine and transmission for a vehicle interconnected by a coupling embodying this invention;

FIG. 2 is a section taken along the lines II—II of FIG. 1;

FIG. 3 is an enlarged section of a portion of FIG. 1 showing the mounting of the valve stem extension for the tire of the coupling;

FIG. 4 is a section taken along the line IV—IV of FIG. 1;

FIG. 5 is a section to the hub of the wheel taken along the line V—V of FIG. 1.

Referring to FIG. 1, an engine 11 of the reciprocating piston, internal combustion type has a crankshaft (not shown) to which the conventional engine flywheel 12 is connected for rotation therewith about an axis 13. The rear end of the engine 11 has a housing portion 14 for containing the flywheel 12. A torque transmitting member in the form of a drum 16 is secured to the engine flywheel by a plurality of cap screws 17. A dust cover 18 is secured to the housing portion by cap screws 19. A slight clearance is provided between the drum 16 and the dust cover 18 to insure rotation of the drum 16 without contact with the dust cover 18. The drum 16 presents an interior friction surface 21 coaxial to axis 13.

The engine is supported on a pair of frame members 24, 26 by resilient mounting pads 27, 28. A power shift transmission 31 is rigidly secured by bolts 32 and nuts 30 to frame members 24, 26. Thus the engine is resiliently supported by the frame of the vehicle to isolate the frame of the vehicle from the vibration of the engine, whereas the transmission is rigidly secured to the frame. Inasmuch as the engine may move vertically and laterally to some extent relative to the transmission input shaft 33 due to its mounting on resilient pads 27, 28, it has been a common practice to employ a pair of universal joints intermediate the engine and the transmission.

Since a power shift transmission 31 is employed, the usual engine clutch can be and has been eliminated in the illustrated embodiment. Inasmuch as power shift transmissions are well known, the details thereof have not been illustrated nor are such details necessary for an understanding of this invention. Vibrations transmitted from the engine to the transmission have long been recognized as damaging to the transmission components. In the illustrated embodiment of the invention, a small conventional pneumatic tire 35 is interposed between the engine and the power shift transmission to eliminate transmission of engine vibrations to the transmission. The radially outer surface 36 of tire 35 is in frictional power transmitting engagement with the cylindrical friction surface 21 of the drum 16. Inflation such as air is achieved by filling the inner tube 41 with a gas through a valve 39 attached to the inner tube 41.

An intermediate shaft 44 is connected to the transmission input shaft 33 through a universal joint 46 including a yoke 47 rigidly secured to the intermediate shaft 44 and a yoke 48 rigidly secured to the transmission input shaft. Yokes 47 and 48 are connected in a conventional manner to a crosshead 51 on axes 52, 53 at right angles to one another. The intermeditate shaft has a hub 55 including a wheel mounting flange 54 which is attached as illustrated in FIGS. 2 and 3 to the wheel 56 by four long bolts 57 secured by nuts 58 and two short bolts 71 secured by nuts 72. Referring to FIGS. 1 and 3, the hub 55 presents a cavity 60 in an elliptical shaped portion 59 thereof through which the valve 39 extends. A similar diametrically opposite cavity 61 is provided for balancing purposes. The valve 39 is mounted in an opening 62 by a flexible grommet 63.

As shown in FIGS. 1 and 2, the elliptically shaped portion 59 extends axially through an elongated elliptically shaped opening 66 in the end wall 67 of the drum 16. The major diameter G of the portion 59 extends in a direction coplanar to the axis 52 of the pivotal connection between yoke 47 and the crosshead 51. Also the diameter G is less than the greatest transverse width, that is the major diameter, of elliptically shaped opening 66. As shown in FIG. 2, a predetermined minimum space D is maintained between the opening 66 and the elliptically shaped portion 59 of hub 55. The configuration of the hub 55 and yoke 47 are better illustrated in FIGS. 4 and 5. The axially extending surface 69 of the end wall of the hub 16 which defines the elliptical opening 66, is in circumferentially confronting relation to the elliptical shaped portion 59.

Referring to FIGS. 2, 4 and 5, the diameter E of the yoke portion of the intermediate shaft 44 is less than the minor diameter F of the elliptical opening 66, in the end wall of the drum 16. The greatest transverse width of the yoke, that is the width in the direction of axis 52, is smaller than the major diameter of the elliptically shaped opening 66 and greater than the minor diameter F thereof. Thus it is seen that the assembly of shaft 44 and deflated tire 35 may be installed first through the engine end of the drum thence passing the yoke 47 through the opening 66 and the hub portion 59 into the opening 66. In the illustrated embodiment the deflated tire will during assembly begin to contact the friction surface 21 before the yoke has completely passed through the elliptical opening 66. It is for this reason that the axis 52 of the yoke 47 is coplanar with the diameter G of hub portion 59. Even with the tire deflated, it is difficult to rotate the tire in the drum and therefore by having the hub and yoke aligned as before mentioned, the tire may be merely pushed axially into the drum without the necessity of rotating it during installation.

The hereinbefore described coupling serves as a vibration dampener between the engine and power shift transmission installed in an engine frame. The tire coupling also compensates for the momentary misalignment occurring between the engine crankshaft and the transmission input shaft due to the engine oscillating or bouncing on the flexible mounts 27, 28. The second universal joint which has heretofore been found necessary in some installations may be eliminated. This invention permits the use of a small conventional tire which is low in cost and the other components of the coupling are likewise low in manufactured cost. The tire serves to isolate the transmission from engine vibration, thus improving the life of the transmission.

The end wall 67 of the drum 16 attached to the engine flywheel not only serves to brace the cylindrical portion of the drum but its elongated opening 66 cooperates with the elliptical shaped hub to positively drive the transmission in case the tire rotatively slips in the drum. If slippage occurs between the cylindrical frictional surface 21 of the drum and frictional surface 36 of the tire 35, the side of the hub portion 59 will engage with the side of opening 66 in the end of the drum and provide a positive driving connection to move the vehicle to a service area where a new tire can be installed or repairs made. When the friction surfaces 21, 36 fail to transmit the torque and permit slippage, the metal to metal coupling produces a clattering noise which is a signal to the operator that the tire has slipped in the drum. The end wall 67 also serves as a shield against foreign material which might otherwise enter the drum and affect the frictional engagement of the tire and drum.

A positive driving connection is also necessary as a safety precaution since tractor loader vehicles, and other vehicular equipment in which the invention may be used, often operate near embankments or in other dangerous conditions and situations. In many situations the operator cannot apply the brakes quickly enough to avoid serious damage to property and human injury should a drive failure occur in the power train between the engine and transmission.

Although only one embodiment of the invention is illustrated and described, it is not intended to limit this invention except as necessitated by the scope of the appended claims.

What is claimed is:

1. A vibration dampening coupling for a power train between an engine output shaft and a transmission input shaft, comprising: an intermediate shaft between said engine output shaft and said transmission input shaft, a drum secured to said engine output shaft presenting an interior cylindrical friction surface in coaxial relation to said engine output shaft, an inflatable tire in frictional engagement with said cylindrical friction surface for rotation in unison therewith, a hub portion on said intermediate shaft, means nonrotatably connecting said tire in torque transmitting relation to said hub portion for rotation therewith, a radially extending end wall on said drum on the axial side of said tire remote from said engine presenting a surface defining an axial opening therein elongated in one transverse direction, a universal joint securing said transmission input shaft to said intermediate shaft including a yoke on each of said input and intermediate shafts pivotally connected to a cross member, respectively, on axes disposed at right angle relation to one another, the axis of said pivotal connection between said intermediate shaft and cross member being substantially coplanar with said one direction, abutment means formed on said hub in circumferentially confronting relation to said surface defining said opening whereby a positive drive is established in event of slippage between said tire and drum, said yoke and hub on said intermediate shaft being insertable axially through said opening without relative rotation between said drum and intermediate shaft.

2. A vibration dampening coupling comprising: a rotary power transmitting drum presenting an interior cylindrical friction surface, an inflatable tire coaxial with and frictionally engaging said cylindrical friction surface for rotation in unison therewith, a power transmitting shaft including a hub with an enlarged flange at one end thereof, means nonrotatably connecting said tire in torque transmitting relation to said flange for rotation therewith, said drum having an open end through which said tire may be passed axially and a radially extending end wall at the other end of said drum, a surface on said end wall defining an axial opening therein elongated in one transverse direction, a yoke formed on the other end of said shaft and adapted for connection with a cross member of a universal shaft, said yoke being insertable through said axial opening when the greatest transverse width of said yoke is substantially aligned with said one direction, and an abutment surface formed on said hub in circumferentially confronting relation to said surface defining said opening whereby a torque transmitting driving connection is established between said hub and wall upon said tire rotatively slipping relative to said drum.

3. The structure set forth in claim 2 wherein the portion of said hub carrying said abutment surface is elliptically shaped and the greatest transverse width of said yoke is substantially aligned with the greatest transverse dimension of said portion of said hub.

4. The structure set forth in claim 3 wherein said yoke and said portion of said hub of said shaft may be inserted in said axial opening without relative rotation between said drum and shaft and wherein upon installation said tire frictionally engages said cylindrical friction surface of said drum before said yoke has passed through said axial opening.

5. A vibration dampening coupling comprising: a rotary power transmitting drum presenting an interior cylindrical friction surface, and having an open end adapted for detachable connection to an engine flywheel, an inflatable tire coaxial with and frictionally engaging said cylindrical friction surface for rotation in unison therewith, a power transmitting shaft including a hub with an enlarged flange at one end thereof, means nonotatably connecting said tire in torque transmitting relation to said flange for rotation therewith, said tire being insertable axially through said open end of said drum, a radially extending end wall on said drum on the axial end thereof opposite said open end, a surface on said end wall defining an axial opening therein elongated in one transverse direction, said shaft extending through said opening, and an abutment surface formed on said hub in circumferentially confronting relation to said surface defining said opening whereby a torque transmitting driving connection is established between said abutment surface of said hub and said surface defining said opening in said wall upon said tire rotatively slipping relative to said drum.

References Cited in the file of this patent

UNITED STATES PATENTS

| | | |
|---|---|---|
| 1,392,902 | Adamson | Oct. 11, 1921 |
| 2,111,422 | Fawick | Mar. 15, 1938 |
| 2,691,283 | Stover | Oct. 12, 1954 |
| 2,822,676 | Horovitz | Feb. 11, 1958 |

FOREIGN PATENTS

| | | |
|---|---|---|
| 537,452 | France | Mar. 3, 1922 |